(12) United States Patent
Ross et al.

(10) Patent No.: US 12,129,358 B2
(45) Date of Patent: Oct. 29, 2024

(54) ALKYL-BRIDGED TIN-BASED THERMAL STABILIZERS FOR HALOGENATED RESINS AND SYNTHESIS AND USES THEREOF

(71) Applicant: PMC Organometallix, Inc., Mount Laurel, NJ (US)

(72) Inventors: Kevin John Ross, Rockwood (CA); Gene Kelly Norris, West Chester, OH (US)

(73) Assignee: PMC Organometallix, Inc., Mount Laurel, NJ (US)

( * ) Notice: Subject to any disclaimer, the term of this patent is extended or adjusted under 35 U.S.C. 154(b) by 201 days.

(21) Appl. No.: 17/184,298

(22) Filed: Feb. 24, 2021

(65) Prior Publication Data

US 2021/0261754 A1  Aug. 26, 2021

Related U.S. Application Data

(60) Provisional application No. 62/980,834, filed on Feb. 24, 2020.

(51) Int. Cl.
 *C08K 5/57* (2006.01)
 *C08L 27/06* (2006.01)
 *C08L 27/24* (2006.01)

(52) U.S. Cl.
 CPC ............ *C08K 5/57* (2013.01); *C08L 27/06* (2013.01); *C08L 27/24* (2013.01); *C08L 2201/08* (2013.01)

(58) Field of Classification Search
 CPC . C08K 5/57; C08L 27/24; C08L 27/06; C08L 2201/08
 See application file for complete search history.

(56) References Cited

U.S. PATENT DOCUMENTS

| | | | |
|---|---|---|---|
| 3,398,114 A * | 8/1968 | Pollock | C08K 5/37 524/180 |
| 3,933,750 A | 1/1976 | Coates et al. | |
| 4,314,934 A | 2/1982 | Smith et al. | |
| 4,386,189 A * | 5/1983 | Ackerman | C08F 8/22 525/331.6 |
| 5,100,946 A | 3/1992 | Hung et al. | |
| 6,258,880 B1 * | 7/2001 | Conroy | C08K 5/134 524/180 |
| 6,919,392 B1 | 7/2005 | Chenard et al. | |
| 2005/0216074 A1 * | 9/2005 | Sahatjian | A61F 2/88 623/1.22 |

FOREIGN PATENT DOCUMENTS

| | | |
|---|---|---|
| CN | 109988382 | 7/2019 |
| EP | 0149696 A1 * | 7/1985 |
| GB | 959129 * | 5/1964 |

OTHER PUBLICATIONS

Jousseaume et al., "A General Route to Alkylene-, Arylene-, or Benzylene-Bridged Ditin Hexachlorides and Hexaalkynides", Organometallics, vol. 21, No. 22, 2002, pp. 4590-4594.*
Machine English translation of CN 109988382, Li et al., Jul. 9, 2019.*
Suyama et al., "Crosslinking of Polyethylene by Dicumyl Peroxide in the Presence of 2,4-Diphenyl-4-methyl-1-pentene", Polymer Journal, vol. 27, No. 4, 1995, pp. 371-375.*

* cited by examiner

*Primary Examiner* — Patrick D Niland
(74) *Attorney, Agent, or Firm* — Stone Pigman Walther Wittmann, L.L.C.; Mackenzie D. Rodriguez

(57) ABSTRACT

The present invention relates to stabilizer composition for halogen-containing polymer. It has recently been found that tin-based thermal stabilizers with a bridging alkyl group between two tin centers are effective stabilizers while having effectively double the molecular weight of the corresponding non-alkyl bridged stabilizer. It is expected that ongoing experimentation will confirm that the alkyl bridged stabilizers have much lower volatility which leads to greater retention of the stabilizer in the finished article.

4 Claims, 5 Drawing Sheets

Thermogravimetric Analysis, all °C.

|  | 1% Mass Loss Temperature | 5% Mass Loss Temperature | 10% Mass Loss Temperature |
| --- | --- | --- | --- |
| Monobutyltin Trichloride (MT) | 46.8 | 79.9 | 93.3 |
| Octyl Ditin Hexachloride (BT) | 55.5 | 105.5 | 152.1 |

Conditions: Samples were run in air at a rate of 10 °C/min to 300 °C.

FIG. 1

$L_{3-x}Cl_xSn\text{-bridge-}SnCl_xL_{3-x}$ $L_3Sn\text{-}X\text{-}SnL_3$ $L_2Sn\text{-}(X)(Y)\text{-}SnL_2$ $[SnL_2\text{-}X\text{-}]_n$

FIG. 4

ALKYL-BRIDGED TIN-BASED THERMAL STABILIZERS FOR HALOGENATED RESINS AND SYNTHESIS AND USES THEREOF

CROSS-REFERENCE TO RELATED APPLICATIONS

This application claims the benefit of U.S. Provisional patent application, Ser. No. 62/980,834, filed 24 Feb. 2020, which is incorporated herein by reference. Priority of U.S. Provisional patent application, Ser. No. 62/980,834, filed 24 Feb. 2020 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to stabilizer composition for halogen-containing polymer. More particularly, the present invention relates to thermal stabilizers for halogen-containing stabilizers, for example polyvinyl chloride or PVC.

2. General Background of the Invention

Processors of non-thermoset polymers have historically struggled with a balance between the ability to process a given polymeric-based material, its properties during processing and its final properties in a finished article. PVC specifically is a thermally unstable polymer at traditional processing temperatures and many stabilizer systems have been developed that attempt to address its inherent thermal instability. These multiple approaches include organic, mixed metal and tin-based stabilizers. PVC and related polymers are also blended and compounded with a variety of other ingredients including, but not limited to, pigments, fillers, lubricants, process aids and impact modifiers. These mixtures are heated during blending and processing by methods including extrusion and injection molding which can lead to the release of volatile materials. These materials may lead to unpleasant odors and/or have potential health effects on exposed workers and part of these volatiles during compounding and processing can be traced to the stabilizing system.

Examples of technologies to lower volatile materials include polymer plasticizers, post stripping the stabilizer to remove the volatile material, post adding an alkyl tin oxide to react with residual Mercaptoester, and, using higher molecular weight esters.

Existing technology of tin-based stabilizers for PVC include the use of 'bridging sulfur'. In contrast to the alkyl-bridged stabilizers of the present invention, the bridging sulfur moieties are reactive and form part of the stabilizing action of the stabilizer containing such groups. As a result, these sulfur bridging groups are transitory in nature and do not effectively increase the molecular weight of such stabilizers and therefore have do not lower the volatility of such materials with respect to their non-sulfur bridged counterparts. The alkyl-bridged stabilizers of the present invention overcomes these problems.

BRIEF SUMMARY OF THE INVENTION

The present invention is a stabilizer composition for halogen-containing polymer. It has recently been found that tin-based thermal stabilizers with a bridging alkyl group between two tin centers are effective stabilizers while having effectively double the molecular weight of the corresponding non-alkyl bridged stabilizer. The alkyl bridged stabilizers have much lower volatility which leads to greater retention of the stabilizer in the finished article. It is expected that other bridging groups, including non-carbon-based bridging groups, would yield similar results.

The alkyl bridged materials described herein are based on tin-alkyl bonds which are not active in the stabilization process and are effective in increasing molecular weight of the stabilizing system. This approach is not limited to monomeric species containing 2 tin sites with a single bridging group and species with multiple tin sites, greater than 2, based on single or multiple tin-terminated alkyl-based bridges should also behave in similar manner.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a chart showing thermogravimetric analysis in ° C.;

FIG. 4 shows preferred embodiments of the stabilizers of the present invention; and, FIG. 5 shows other possible bridging groups.

DETAILED DESCRIPTION OF THE INVENTION

The present invention is a stabilizer composition for halogen-containing polymer. It has recently been found that tin-based thermal stabilizers with a bridging alkyl group between two tin centers are effective stabilizers while having effectively double the molecular weight of the corresponding non-alkyl bridged stabilizer. The alkyl bridged stabilizers have much lower volatility which leads to greater retention of the stabilizer in the finished article.

Figure 2:
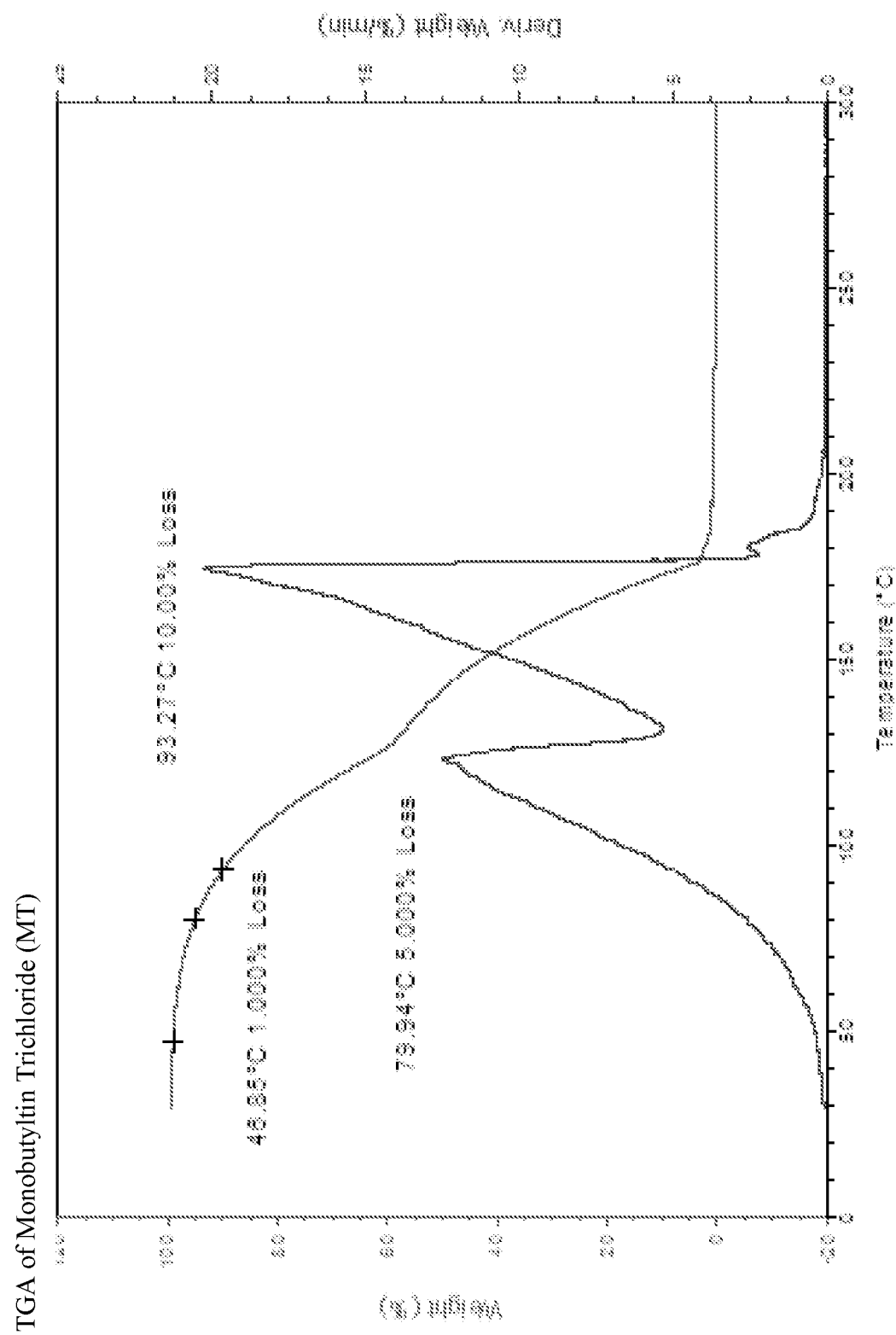
FIG. 2 is a chart showing TGA of Monobutyltin Trichloride (MT)
Figure 3:
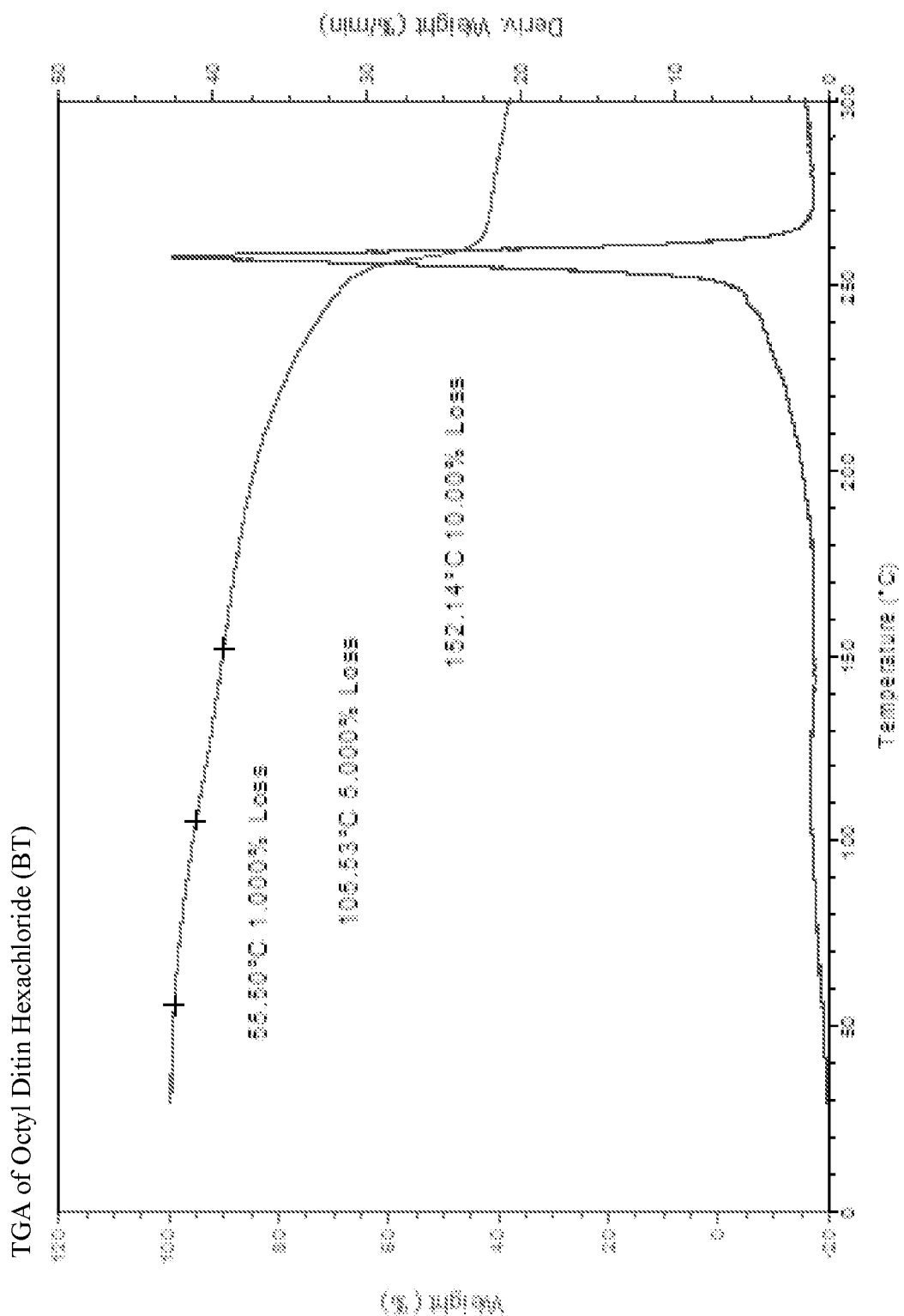
FIG. 3 is a chart showing TGA of Octyl Ditin Hexachloride (BT)

Testing to determine weight loss of the stabilizer precursors at elevated temperatures confirms that non-bridged stabilizers have higher volatility and higher weight loss versus the alkyl-bridged stabilizers of the present invention. The focus of the testing was the halogen-based tin compounds that are the ultimate product of stabilization of a halogen-containing polymer, namely the alkyltin chlorides. This testing confirms that the non-bridged stabilizers, represented by Monobutyltin Trichloride or MT, have higher volatility and subsequently higher weight loss over the experimental period versus the bridged analogues, represented by Octyl DiTin Hexachloride or BT, see FIG. 1. In can be further noted as shown in FIGS. 2 and 3, that at approximately 200° C., which is at the high end of the temperature range of PVC processing, MT was completely lost while BT has undergone less than 20% weight loss. BT can be viewed as an effective dimer of the MT species, which would result from the use of a traditional non-bridged tin stabilizers of the sort monobutyltin tris(EHMA). Both of the chlorides in FIG. 1 would be created as the ultimate stabilization product by displacement of the reactive ligands of their respective starting thermal stabilizers. In addition to lower weight loss during processing, it is expected that bridging species will also be less susceptible to extraction during their in-use lifetimes. These species are expected to offer improved odor characteristics due to the expected lower volatility of partially substituted species from stabilization of the type $L_{3-x}Cl_xSn$-bridge-$SnCl_xL_{3-x}$, where $x=1$ or 2, for bridging stabilizers, and L can be mercaptide ligand among others, As shown in FIG. 4.

PVC Compound Formulation:

Test Conditions: The PVC compound was blended following standard additive addition order and temperature. The color stability of each compound was evaluated using a Brabender running operating at 190 degrees Celsius/60 rpm with samples taken in 2-minute intervals. The colors of each chip were measured relative to a standard white tile and "L Values" and "b Values" reported in the tables 2 and 3, respectively, below.

Description of STABILIZER Preparations

Synthesis of $Cl_3Sn$—$C_8H_{16}$—$SnCl_3$ (Octyl Ditin Hexachloride). This material was synthesized according to published methods, see Organometallics, Vol 21, No. 22, 2002.

Synthesis of High Mono-Octyltin $(RE)_3$, follows Route A described below. In this case the Mercapto Sulfur ester is 2-Mercaptoethyl ester of C16-C18 unsaturated fatty acid. These are commonly referred to as Reverse Ester PVC Stabilizers.

Synthesis of $(RE)_3Sn$—$C_8H_{16}$—$Sn(RE)_3$ follows Route B described below. In this case the Mercapto Sulfur ester is 2-Mercaptoethyl ester of C16-C18 unsaturated fatty acid. These are commonly referred to as Reverse Ester PVC Stabilizers.

Synthesis of High Mono-Octyltin $(EHMA)_3$ follows Route A described below. In this case the Mercapto Sulfur ester is 2-Ethylhexyl Mercaptoacetate.

Synthesis of $(EHMA)_3Sn$—$C_8H_{16}$—$Sn(EHMA)_3$ follows Route B described below. In this case the Mercapto Sulfur ester is 2-Ethylhexyl Mercaptoacetate.

Synthesis Route A 1.02 eq of Mercapto Sulfur containing ester were reacted with a mixture of Monooctyl Tin Trichloride (95 wt %) and Dioctyl Tin Dichloride (5 wt %) representing 1.0 equivalents of chloride using aqueous Sodium Hydroxide aqueous solution to convert the Chloride to the Mercaptide. This mixture is allowed to settle for 60 minutes to allow the organic and aqueous phases to split. The bottom aqueous layer is removed, and the remaining organic phase was dried under vacuum and heat. This was then filtered to yield a clear liquid.

Synthesis Route B 1.02 eq of Mercapto Sulfur containing ester were reacted with a mixture of Octyl Tin Hexachloride representing 1.0 equivalents of chloride using aqueous Sodium Hydroxide aqueous solution to convert the Chloride to the Mercaptide. This mixture is allowed to settle for 60 minutes to allow the organic and aqueous phases to split. The bottom aqueous layer is removed, and the remaining organic phase was dried under vacuum and heat. This was then filtered to yield a clear liquid.

These stabilizers were evaluated for their effect on PVC processing, in particular their impact of color developing as function of heat and time relative to their traditional non-bridged counterparts, namely high mono-octyl Sn $(EHMA)_3$ and high mono-octyl Sn $(RE)_3$. These stabilizers were compounded in the PVC formulation shown:

TABLE 1

Blend Compositions

| | PHR | | | |
|---|---|---|---|---|
| Component | Sample1 | Sample 2 | Sample 3 | Sample 4 |
| Shintech SE-950 PVC resin | 100.0 | 100.0 | 100 | 100 |
| High mono-octyltin$(EHMA)_3$ | 1.41 | | | |
| $(EHMA)_3Sn$—$C_8H_{16}$—$Sn(EHMA)_3$ | | 1.39 | | |
| High mono-octyltin$(RE)_3$ | | | 2.28 | |
| $(RE)_3Sn$—$C_8H_{16}$—$Sn(RE)_3$ | | | | 2.36 |
| Lubricant package, Advalube ® B3314 | 2.5 | 2.5 | 2.5 | 2.5 |
| Impact Modifier, Durastrength 535 | 5.0 | 5.0 | 5.0 | 5.0 |
| Calcium Carbonate, Omya UFT | 3.0 | 3.0 | 3.0 | 3.0 |
| Chemours 960 TiO2 Pigment | 10.0 | 10.0 | 10.0 | 10.0 |

Test Conditions: The PVC compound was blended following standard additive addition order and temperature. The color stability of each compound was evaluated using a Brabender running operating at 190 degrees Celsius/60 rpm with samples taken in 2-minute intervals. The colors of each chip were measured relative to a standard white tile and "L Values" and "b Values" reported in the tables 2 and 3, respectively, below.

Samples 1 and 2 are non-alkyl bridged and alkyl-bridged species based on octyltin centers and EHMA as ligand. At equivalent tin the alkyl-bridged species provides effectively equivalent stabilizing performance versus its non-bridged counterpart as judged by the similarity of the color development as outlined in Tables 2 and 3.

Samples 3 and 4 are non-alkyl bridged and alkyl-bridged species based on octyltin centers and RE as ligand. At equivalent tin the alkyl-bridged species provides effectively equivalent stabilizing performance versus its non-bridged counterpart as judged by the similarity of the color development as outlined in Tables 2 and 3.

TABLE 2

Color Values, L value data

| Time (Min) | Sample 1 | Sample 2 | Sample 3 | Sample 4 |
|---|---|---|---|---|
| 2 | 89.4 | 88.5 | 88.8 | 89.5 |
| 4 | 89.5 | 89.2 | 89.7 | 89.6 |
| 6 | 88.9 | 88.9 | 90.5 | 90.3 |
| 8 | 88.9 | 90.0 | 90.3 | 91.2 |
| 10 | 91.5 | 83.8 | 90.8 | 91.9 |

TABLE 3

| Color Values, b Value data | | | | |
|---|---|---|---|---|
| Time (Min) | Sample 1 | Sample 2 | Sample 3 | Sample 4 |
| 2 | 0.88 | 0.89 | 1.43 | 2.5 |
| 4 | 1.43 | 1.45 | 2.55 | 3.7 |
| 6 | 1.94 | 2.22 | 3.17 | 3.9 |
| 8 | 3.19 | 5.11 | 3.82 | 8.4 |
| 10 | 19.07 | 23.5 | 4.82 | 29.5 |

The stabilizer composition of the present invention for halogen-containing polymers, preferably comprises at least two tin-based centers having a bridging alkyl group between the tin-based centers. This formula can have multiple tin-based centers and corresponding multiple bridging alkyl groups. The stabilizer may be of one of the following types:

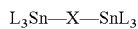

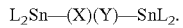

In these types, L is preferably a traditional ligand, such as esters of thioglycolic acid, 2-ME esters of C12-C18 fatty acids, carboxylates, maleates, sulfides, 2-ME, mercaptans, or any blends thereof. X and Y are preferably tin-terminated alkyl-based bridging groups. X and or Y can be linear or branched, saturated or unsaturated, with or without heteroatoms, and/or with or without heterocycles. The alkyl bridge is preferably C1 to C80.

In other embodiments, the stabilizer composition comprises at least three repeating units of $—[SnL_2\text{-}X—]_n$, where X is a tin-terminated alkyl-based bridging group and L is a traditional ligand. In these embodiments, X may be linear or branched, saturated or unsaturated, with or without heteroatoms, and/or with or without heterocycles. Preferably, the alkyl bridge is C1 to C80. Preferably, L is an ester of thioglycolic acid, a 2-ME ester of C12-C18 fatty acids, a carboxylate, a maleate, a sulfide, 2-ME, a mercaptan, or any combination of two or more of an ester of thioglycolic acid, a 2-ME ester of C12-C18 fatty acids, a carboxylate, a maleate, a sulfide, 2-ME, or a mercaptan.

The present invention also includes the resulting PVC, CPVC, or a blend of PVC and CPVC that contains the novel stabilizer described above. Preferably, the resulting composition contains at least 0.5% by weight stabilizer.

Figure 5:
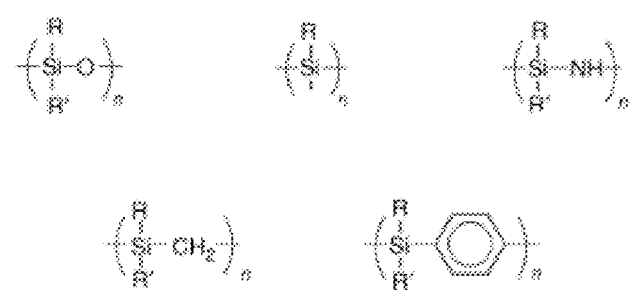

It is expected that other bridging groups, including non-carbon-based bridging groups, would yield similar results. For example, silicones (siloxanes), silanes (silylenes), silazanes, carbosilances, and silphenylenes, as shown in FIG. 5, may offer easier synthetic routes than the carbon-based bridging groups.

The present invention also includes a method of preparing the novel alkyl-bridged stabilizer.

The present invention also includes a method of preparing PVC, CPVC, or blends thereof containing the novel alkyl-bridged stabilizer. Preferably, these compositions are prepared according to Synthesis Route A or B described above.

The invention claimed is:

1. A stabilizer composition for halogen-containing polymers, the stabilizer composition comprising at least two tin-based centers, and at least one bridging alkyl group between the at least two tin-based centers wherein the bridging alkyl group is tin-bound and where the bridging alkyl group is not active in the stabilization process and is effective in increasing the molecular weight of the stabilizer composition, wherein the stabilizer composition is of a type $L_2Sn—(X)(Y)—SnL_2$, wherein L is a ligand chosen from the group consisting of esters of thioglycolic acid, 2-ME esters of C12-C18 fatty acids, carboxylates, maleates, sulfides, 2-ME, mercaptans, and a blend thereof, and wherein X and Y are tin-terminated, alkyl bridging groups.

2. The stabilizer composition of claim 1 wherein X and Y are linear or branched, saturated or unsaturated, with or without heteroatoms, with or without heterocycles, where the alkyl-based bridging group is C1 to C80.

3. A composition of PVC, CPVC or a blend thereof, the composition comprising a stabilizer, the stabilizer comprising:

at least two tin-based centers; and,
at least one bridging alkyl group between the at least two tin-based centers wherein the bridging alkyl group is tin-bound, and,
wherein the bridging alkyl group is not active in the stabilization process and is effective in increasing the molecular weight of the stabilizer composition
wherein the stabilizer is of a type $L_2Sn—(X)(Y)—SnL_2$,
wherein L is chosen from the group consisting of an ester of thioglycolic acid, a 2-ME ester of C12-C18 fatty acids, a carboxylate, a maleate, a sulfide, 2-ME, a mercaptan, and any combination of two or more of an ester of thioglycolic acid, a 2-ME ester of C12-C18 fatty acids, a carboxylate, a maleate, a sulfide, 2-ME, and a mercaptan, and
wherein X and Y are tin terminated alkyl bridging groups.

4. The composition of claim 3 wherein X and Y are linear or branched, saturated or unsaturated, with or without heteroatoms, with or without heterocycles, where the alkyl-based bridging group is C1 to C80.

* * * * *